United States Patent [19]

Kano et al.

[11] Patent Number: 5,012,107

[45] Date of Patent: Apr. 30, 1991

[54] RADIATION IMAGE STORAGE PANEL

[75] Inventors: Akiko Kano; Satoshi Honda; Kuniaki Nakano, all of Hino, Japan

[73] Assignee: Konica Corporation, Tokyo, Japan

[21] Appl. No.: 361,198

[22] Filed: Jun. 5, 1989

[30] Foreign Application Priority Data

Jun. 13, 1988 [JP] Japan ................................ 63-143639

[51] Int. Cl.[5] ...................... G01N 21/64; G01N 21/00

[52] U.S. Cl. ............................... 250/484.1; 250/327.2

[58] Field of Search .................. 250/484.1 B, 327.2 R, 250/327.2 A, 327.2 J, 327.2 B, 483.1

[56] References Cited

U.S. PATENT DOCUMENTS 4,368,390 1/1983 Takahashi et al. ............. 250/363.01

4,380,702 4/1983 Takahashi et al. ............... 250/327.2

4,621,196 11/1986 Arakawa .......................... 250/483.1

4,628,208 12/1986 Arakawa .......................... 250/483.1

*Primary Examiner*—Constantine Hannaher

*Assistant Examiner*—Edward J. Glick

*Attorney, Agent, or Firm*—Finnegan, Henderson, Farabow, Garrett, and Dunner

[57] ABSTRACT

A radiation image storage panel which comprises a support and a light-shielding layer, a light-scattering layer and a stimulable phosphor layer formed on the support in succession.

According to this invention, a radiation image storage panel provides radiation images that are high in radiation sensitivity and sharpness.

12 Claims, 3 Drawing Sheets

RADIATION IMAGE STORAGE PANEL

BACKGROUND OF THE INVENTION

This invention relates to a radiation image storage panel having a stimulable phosphor layer, and in particular, a radiation image storage panel that can provide radiation images which are high in radiation sensitivity and sharpness.

Radiation images like X-ray images are often used in the diagnosis of diseases. Conventional X-ray image storage methods include those in which images are directly taken from a phosphor layer rather than utilizing a light-sensitive silver halide material. For example, radiation (generally X-ray) transmitted through a subject is absorbed by a phosphor, and thereafter this phosphor is excited by light or heat energy to bring the absorbed radiation energy stored to radiate as fluorescence. The fluorescence is detected and formed into an image.

Specifically, U.S. Pat. No. 3,859,527 and Japanese Unexamined Patent Publication No. 12144/1980 disclose radiation image storage methods in which a stimulable phosphor is used and visible light or infrared rays are used as stimulating light. This method employs a radiation image storage panel (hereinafter referred to as "storage panel") comprising a support formed thereon with a stimulable phosphor layer (hereinafter referred to simply as "stimulable layer"). Radiation transmitted through a subject is absorbed by the stimulable layer and radiation energy corresponding to the radiation transmission degree of all areas of the subject is stored to form a latent image. Thereafter this stimulable layer is scanned with the stimulating light causing the stored radiation energy to into light. Thus, an image according to signals based on the strength of this light is obtained.

The image finally obtained may be reproduced as a hard copy, or may be reproduced on a CRT.

Generally speaking, the radiation sensitivity of the storage panel has a tendency to be higher when the stimulable layer is thick. On the other hand, the sharpness of the storage panel has a tendency to be higher when the thickness of the stimulable layer is decreased.

Prior art concerning the storage panel have been disclosed in, for example, Japanese Unexamined Patent Publication No. 11393/1981 in which a metal light-reflective layer is provided on one intersurface of a stimulable layer. The stimulable layer is prepared by dispersing stimulable phosphors into binders. According to this method, the metal light-reflective layer replaces the inner part of the stimulable layer that is away from a surface of the stimulable layer to which the stimulating light incidents. The stimulable layer can be made thinner, and the spread of the stimulating light into the stimulable layer can be suppressed. Therefore, a radiation image with high sharpness is obatined. Although this method can suppress the spread or scattering of the stimulating light in the layer because of the decrease in thickness of the stimulable layer, the stimulating light to reach the metal light-reflective layer while scattering in the layer has poor directivity. The stimulating light is reflected corresponding to the incidence with the metal light-reflective layer and returned to the stimulable layer side to repeat scattering in the stimulable layer again. The stimulable phosphor is widely stimulated, thus the improvement of sharpness of images is low.

Japanese Unexamined Patent Publication No. 12600/1981 discloses a method in which a reflective layer of white pigments is provided (instead of the metal light-reflective layer as described in Japanese Unexamined Patent Publication No. 11393/1981) on one surface of a stimulable layer, which is formed by dispersing stimulable phosphors into binders. According to this method the light-reflective layer of white pigments replaces the inner part of the stimulable layer that is away from a surface of the stimulable layer to which the stimulating light incidents. Thus, the thickness of the stimulable layer can be further decreased to enable the suppression of the spread of the stimulating light into the stimulable layer, resulting in the production of radiation images with high sharpness.

However, the stimulable phosphor is a kind of white pigment. That is, this method is conducted by merely replacing a part of the stimulable layer, which has been formed by dispersing the stimulable phosphor into the binders with the white pigment layer which is formed by dispersing the white pigment into the binders. For this reason, this method can suppress the spread or scattering of the stimulating light in the stimulable layer with decreased thickness of the stimulable layer. However, the stimulating light that reaches the light-reflective layer of white pigment while scattering in the stimulable layer is reflected irregularly on the surface of the light-reflective layer of white pigments, or scattered in the light-reflective layer of white pigments and reflected to the stimulable layer side. Thus, the stimulating light is scattered in the stimulable layer again to stimulate the stimulable phosphor widely, resulting in less improvement of sharpness of images.

A stimulable layer containing no binder, as described in Japanese Unexamined Patent Publication No. 73100/1986, can significantly improve not only the charge ratio of the phosphor, but also the directivity of the stimulating light and stimulated emission in the stimulable layer. This results in an improvement of the sensitivity of the storage panel to radiation and, at the same time, an improvement in the sharpness of images. Since the vapor deposition and sputtering methods are appropriate for the preparation of the stimulable layer containing no binder, the support used must have heat-resistance. For this reason, crystallized glasses, chemically reinforced glasses and the like can preferably be used as a support. However, these supports also must be somewhat thick. Thus, a part of the stimulating light is scattered violently in the support, resulting in less sharp images.

The present inventors have proposed a storage panel in which a light-reflective layer is provided on an intersurface of either one side of the stimulable layer, described in Japanese Unexamined Patent Publication No. 133399/1987, and a storage panel in which a light-scattering layer is provided on an intersurface of either one side of the stimulable layer, described in Japanese Unexamined Patent Publication No. 133400/1987. Although these storage panels have excellent radiation image sensitivity and sharpness of images, there is a room for improvement.

SUMMARY OF THE INVENTION

As mentioned above, there has never been a storage panel that is excellent both in radiation sensitivity and in sharpness.

Accordingly, an object of this invention is to provide a storage panel which is excellent in both radiation sensitivity and sharpness.

The radiation image storage panel of this invention comprises a support and a light-shielding layer, a light-scattering layer and a stimulable phosphor layer formed on the support in succession.

DESCRIPTION OF THE PREFERRED EMBODIMENTS

Figure 1:
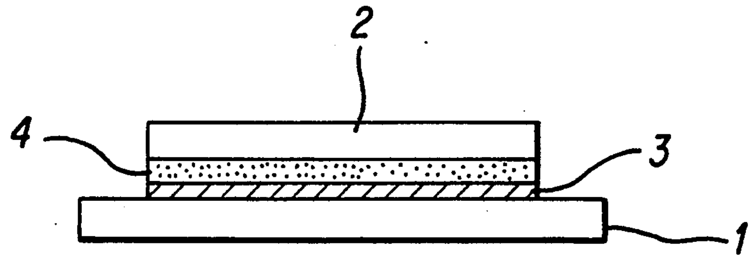
FIG. 1 is a schematic cross-sectional view of the storage panel of this invention.
Figure 2:
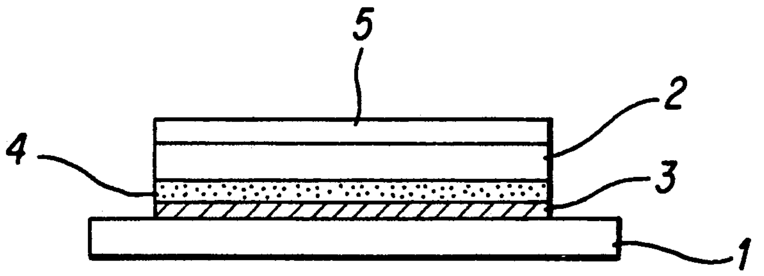
FIG. 2 is a schematic cross-sectional view of the storage panel of this invention.

The construction of the storage panel of this invention will be described by referring to the drawings. FIG. 1 and FIG. 2 are schematic cross-sectional views showing an example of the storage panel of this invention. In these drawings, the numeral 1 denotes a support, 2 denotes a stimulable layer, numeral 3 denotes a light-shielding layer, numeral 4 denotes a light-scattering layer, and numeral 5 denotes a protective layer, respectively.

The storage panel of this invention comprises the stimulable layer 2 on the support 1 as shown in FIGS. 1 and 2, and further comprises a light-shielding layer 3 and a light-scattering layer 4 as a constitutional element. The light-shielding layer 3 and light-scattering layer 4 are provided between the support 1 and stimulable layer 2. The light-shielding layer 3 being formed next to support 1 and light-scattering layer 4 being formed next to stimulable layer 2.

The storage panel of this invention may include a storage panel in which a protective layer 5 is provided on the stimulable layer 2 for protecting the stimulable layer 2 from the external chemical and physical stimulations.

The stimulable phosphor constituting the stimulable layer in the storage panel of this invention refers to a phosphor exhibiting stimulated emission corresponding to the dose of the first light or high energy radiation by optical, thermal, mechanical chemical or electrical stimulation (stimulating excitation) after irradiation of the first light or high energy radiation. Preferably the phosphor will be exhibiting stimulated emission by a stimulating light of a wavelength 500 nm or longer. Such a stimulable phosphor may include, for example, those represented by $BaSO_4:Ax$ as disclosed in Japanese Unexamined Patent Publication No. 80487/1973; those represented by $SrSO_4:Ax$ as disclosed in Japanese Unexamined Patent Publication No. 80489/1973; those such as $Li_2B_4O_7:Cu$, Ag, etc. as disclosed in Japanese Unexamined Patent Publication No. 39277/1978; those such as $Li_2O(B_2O_2)_x:Cu$ and $Li_2O.(B_2O_2)_x:Cu,Ag$, etc. as disclosed in Japanese Unexamined Patent Publication No. 47883/1979; those represented by SrS:Ce,Sm, SrS:Eu,Sm, $La_2O_2S:Eu,Sm$ and (Zn,Cd)S:Mn,X as disclosed in U.S. Pat. No. 3,859,527. Also included may be ZnS Cu,Pb phosphors, barium aluminate phosphors represented by the formula $BaO.xAl_2O_3:Eu$ and alkaline earth metallosilicate type phosphors represented by the formula $M^{II}O.xSiO_2:A$ as disclosed in Japanese Unexamined Patent Publication No. 12142/1980.

Additional examples of phosphors may include:

(1) as disclosed in Japanese Unexamined Patent Publication No. 12143/1980, alkaline earth fluorohalide phosphors represented by the following formula:

$$(Ba_{1-x-y}Mg_xCa_y)FX:Eu^{2+};$$

(2) phosphors as disclosed in Japanese Unexamined Patent Publication No. 12144/1980 which corresponds to U.S. Pat. No. 4,236,078: LnOX:xA;

(3) phosphors as disclosed in Japanese Unexamined Patent Publication No. 12145/1980: $(Ba_{1-x}M^{II}_x)FX:yA$;

(4) phosphors as disclosed in Japanese Unexamined Patent Publication No. 84389/1980: BaFX:xCe,yA;

(5) rare-earth elements activated divalent metallic fluorohalide phosphors as disclosed in Japanese Unexamined Patent Publication No. 160078/1980: $M^{II}FX.xA:yLn$;

(6) phosphors represented by any of the formulas shown below: ZnS:A, CdS:A, (Zn,Cd)S:A, ZnS:A,X and CdS:A,X;

(7) phosphors as disclosed in Japanese Unexamined Patent Publication No. 38278/1984, represented by any of the formulas shown below: $xM_3(PO_4)_2.NX_2:yA$ and $M_3(PO_4)_2:yA$;

(8) phosphors as disclosed in Japanese Unexamined Patent Publication No. 155487/1984, represented by any of the formulas shown below: $nReX_3.mAX'_2:xEu$ and $nReX_3.mAX'_2:xEu,ySm$;

(9) alkali halide phosphors as disclosed in Japanese Unexamined Patent Publication No. 72087/1986, represented by the formula shown below: $M^{I}X.aM^{II}X'_2:bM^{III}X''_3:cA$; and

(10) bismuth activated alkali halide phosphors disclosed in Japanese Unexamined Patent Publication No. 228400/1986 represented by the formula: $M^{I}X:xBi$, and the like. Alkali halide phosphors are preferable, because stimulable phosphor layers can be formed easily by vapor deposition, sputtering, etc.

However, the stimulable phosphor to be used in the radiation image storage panel of this invention is not limited to those as described above. Any phosphor which exhibit stimulated fluorescence when irradiated with a stimulating light after irradiation of radiation may be useful.

The stimulable layer of the storage panel of this invention may have a group of stimulable layers containing one, two or more stimulable layers comprising at least one of the stimulable phosphors as mentioned above. The stimulable phosphors to be contained in the respective stimulable phosphor layers may be either identical or different.

A method for forming the stimulable layer is an applied coating method as described in Japanese Unexamined Patent Publication No. 12600/1981, and a physical vapor deposition method.

The stimulable layer formed by physical vapor deposition method is higher in charge ratio of the phosphors than that of the stimulable layer formed by the coating method. The result is a layer that has a higher sensitivity to radiation.

The thickness of the stimulable layer of the storage panel according to this invention may differ depending on the sensitivity of the radiation image storage panel to be used, the kind of the stimulable phosphor, etc. The thickness may preferably be, in the case where no binder is contained, within the range of from 10 to 1,000 μm, and more preferably from 30 to 800 μm. In the case where a binder is contained, the thickness preferably should be within the range of from 20 to 1,000 μm, and more preferably from 50 to 500 μm.

The support to be used for the storage panel of this invention may be made of various kinds of polymer materials, glasses such as a crystallized glass, ceramics, metals, etc.

The polymeric materials may include films made of, for example, cellulose acetate, polyesters, polyethyleneterephthalate, polyamides, polyimides, triacetate, polycarbonate, etc. The metals may include metallic sheets or metal plate made of aluminum, iron, copper, chromium, etc., or metallic sheets or metal plates having a coated film of oxides of said metals thereon. The glasses may include chemical reinforced glass, crystallized glass, etc. Also, the ceramics may include sintered plates of alumina, zirconia, etc. When the stimulable layer is formed by the vapor phase build-in method, the preferred support is the crystallized glass.

The thickness of these supports, which vary depending on the quality of the support to be used, may generally be in the range of 80 μm to 5 mm, and preferably, in view of ease of handling, 200 μm to 3 mm.

The surface of these supports may be smooth or, alternatively, a mat surface may be used for the enhancement of adhesiveness with an upper layer. The surface of the supports may also be made to be a concave-convex surface, or alternatively may have a surface structure on which densely placed fine tile-shaped plates are provided.

The largest feature of the storage panel according to this invention is to place the light-shielding layer and light-scattering layer in succession from the support side, between the support and stimulable layer. When there is a light-shielding layer only the sensitivity of images becomes lower, and when there is a light-scattering layer only, the sharpness of images becomes lower. The use of just one of these layers will not accomplish the object of this invention.

The effect of the storage panel of this invention is particularly high when the support has a property that can scatter a part of the stimulating light therein. For example, the above-mentioned crystallized glass, chemical reinforced glass, ceramic sintered plates, etc. will accomplish this.

The light-shielding layer of the storage panel, according to this invention, is a layer which acts to prevent transmission of the stimulating light by absorbing or reflecting it on the surface of the layer.

The light-shielding layer of this invention has preferably a light transmittance of 5% or less, and more preferably 1% or less. Such a light transmittance will prevent transmission of the stimulating light having wavelengths of 500 to 900 nm, and particularly 600 to 800 nm, by mainly reflecting or absorbing it. Also, the light-shielding layer preferably has a light reflective index of 70 to 200% to the stimulating light for the purpose of reflection of the stimulating light, and 70% or less for the purpose of absorption of the stimulating light. Here, the light reflective index is measured by defining a standard white board (MgO) as 100%, and the light transmittance, defining air as 100%. In both cases, measurement was conducted by use of a spectrometer S57 model produced by Hitachi K.K using a cell of 10 mm in thickness. The device is similarly used hereinbelow.

The light transmittance and light reflective indices are the values measured by using the layer of the thickness that is practically used, respectively. Materials constituting the light-shielding layer may include, for example, metals such as aluminum, nickel, chromium, silver, copper, platinum, rhodium, etc., black-type ceramics such as titanium oxide ($TiO_x$; $1 \leqq x \leqq 2$), chromium oxide ($Cr_2O_3$), a mixture of aluminum oxide and titanium oxide ($Al_2O_3.xTiO_y$;$0.1 \leqq x \leqq 0.5$, $1 \leqq y \leqq 2$), etc.

The method for forming the light-shielding layer is appropriately selected depending on the constitutional materials. For example, when the above-mentioned metals are used, the layer may be formed by the vapor deposition method, sputtering method, ion plating method, plating method, flame-spraying method, etc. When the black type ceramics are used, the coating method, flame-spraying method and the like are applied. The flame-spraying method may include the gas-type flame-spraying method in which high temperature gas flame is used as a heat source, the electric-type flame-spraying method in which arc or plasma is used as a heat source, etc. The gas-type flame-spraying method has an advantage that the production cost is low, and the electric-type flame-spraying method has an advantage that films having high density and good adhesiveness can be obtained thereby.

The thickness of the light-shielding layer is preferably 0.01 to 0.5 μm when the methods such as the vapor deposition and sputtering are used, and 10 to 100 μm when the methods such as the plating method, and flame-spraying method are used. When the thickness of the liht-shielding layer is thinner than the lower limit, the transmission of the stimulating light becomes undesirably large. When it is over the upper limit, the adhesiveness may be lowered, and warpage and distortion may occur.

The light-scattering layer of the storage panel according to this invention acts to reflect and scatter the stimulating light and/or stimulated emission having a wavelength of 300 to 900 nm therein. The storage panel with desired sensitivity and sharpness can easily be obtained by controlling the degree of scattering of light by appropriately increasing or decreasing the thickness of the light-scattering layer.

The light-scattering layer preferably has a light reflective index of 40% or more, more preferably 60% or more for accomplishing the object.

As a material for constituting the light-scattering layer, there may be included white pigments such as white lead, zinc oxide and titanium oxide; ceramics such as aluminum oxide ($Al_2O_3$) and zirconium oxide ($ZrO_2$), or a mixture thereof with at least one of titanium oxide ($TiO_2$), silicate dioxide ($SiO_2$), magnesium oxide ($MgO$), calcium oxide ($CaO$) and calcium carboxide ($CaCO_3$), e.g. aluminum oxide—titanium oxide ($Al_2O_3.xTiO_2$; $0.01 \leqq x \leqq 0.05$), aluminum oxide—silicate dioxide ($Al_2O_3.xSiO_2$; $0.01 \leqq x \leqq 0.5$) and zirconium oxide—magnesium oxide ($ZrO_2.xMgO$; $0.01 \leqq x \leqq 0.5$); glasses and the like. Among them, preferred are those being excellent in heat-resistance, and this will not deteriorate when heat is applied during preparation of the storage panel (for example, in the case where the stimulable layer is formed by the vapor deposition method). Such glasses are ceramics and the like.

The method of forming the light-scattering layer is not particularly limited, but the layer preferably is formed by use of the flame-spraying method. The method can form a layer with even thickness over a large area. Accordingly, the light-scattering layer is preferably formed by using the above-mentioned ceramics, and particularly white type ceramics according to the flame-spraying method.

Flame-spraying material may be any of powdery shape, rod-like shape, etc. The average particle size of the powdery flame-spraying materials is preferably 50 μm or less, more preferably 30 μm or less.

The thickness of the light-scattering layer, which is appropriately determined depending on the degree of the reflection and scattering as mentioned above, may preferably be 5 to 200 μm, more preferably 20 to 100 μm in view of accomplishing the object of this invention. An overly small thickness of the light-scattering layer may cause decrease of the ratio of the stimulated emission which is reflected and scattered in the light-scattering layer and returned to the stimulable layer, resulting in a lowering of sensitivity. An overly large thickness thereof may cause excessive spread of the stimulated emission in the light-scattering layer, resulting in a lowering of sharpness.

In this invention, it is also possible to change the storage panel with a sensitivity corresponding to the pattern of the dose of radiation absorbed in the subject as described in Japanese Unexamined Patent Publication No. 214700/1988 by utilizing the feature of this invention that the sensitivity can be varied with the change of the thickness of the light-scattering layer. Also, the surface and/or internal portion of the light-scattering layer may be colored by use of the dyes and pigments described in the specification of the above application.

The surfaces of the light-shielding layer and light-reflective layer may be smooth or uneven (concave-convex pattern).

In the storage panel of this invention, an undercoat layer may be provided between layers constituting the storage panel for the purpose of enhancement in adhesiveness of the respective layers.

In the storage panel of this invention, at least one protective layer may be further provided on the stimulable layer for the purpose of protecting the stimulable layer from chemical stimulation and from external atmosphere, particularly moisture.

Preferred as the material forming such protective layer are those having good transparency and being capable of forming a sheet. Also, the protective layer are those materials preferably showing high transparency in the wide wavelength range for transmitting efficiently the stimulating light and stimulated emission; preferably having a transparency of 80% or more. As such protective layers, there may be included, for example, plate glasses of quartz glass, borosilicate glass, chemical reinforced glass, organic polymeric compounds such as PET, OPP, polyvinylchloride, etc. Here, the borosilicate glass shows a transmission of 80% or more in the wavelength region of 330 nm to 2.6 μm, and the quartz glass shows high transmission in the further shorter wavelength region.

As those forming the protective layer, preferred is the plate glass because it shows a moisture-inhibiting property as well as light transmittance.

The thickness of the protective layer is 10 μm to 3 mm in practical use, preferably 100 μm or more for obtaining a good water vapor barrier property. When the thickness of the protective layer is 500 μm or more, a storage panel with excellent durability and long lifetime can preferably be obtained.

In the storage panel of this invention, a layer in which the light reflective index is lower than that of the protective layer may be provided between the stimulable layer and the protective layer. Further, between the stimulable layer and the above-mentioned layer having lower light reflective index, there may be provided a layer having a higher light reflective index than that of the above-mentioned low light reflective index layer. By using the above constructions of the protective layers, the durability and lifetime of the storage panel can be enhanced without impairing the sharpness of images.

The provision of having a reflection preventing layer such as $MgF_2$ on the surface of the protective layer will allow for efficient transmission of stimulating light and stimulated emission, as well as suppression of lowering in sharpness.

The light reflective index of the protective layer, which is not particularly limited, may be generally in the range of 1.4 to 2.0.

The protective layer may comprise two or more layers, if desired. Particularly, preferred is the construction as disclosed in Japanese Unexamined Patent Publication No. 15500/1987 in which two or more layers, which are different from each other in region, are combined in view of the water vapor barrier property.

In the storage panel of this invention, the protective layer may serve as the function of the protective layer. In this case, there is no need for the substantial function of supporting the stimulable layer. The storage panel of this invention is used for the radiation image converting method schematically indicated in FIG. 3.

Figure 3:
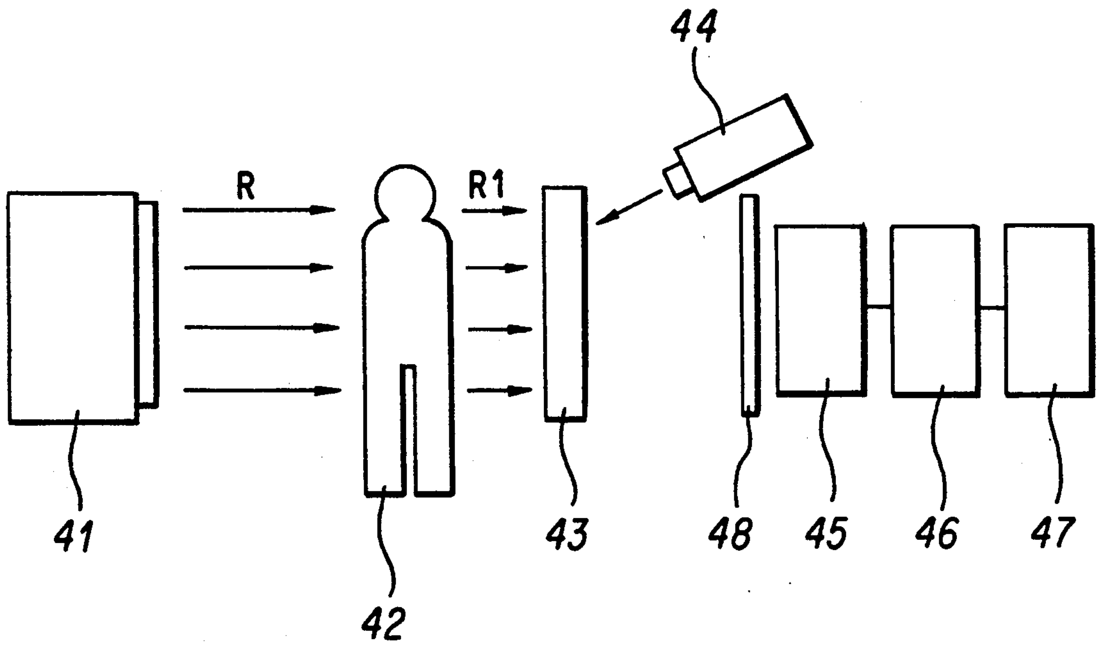
FIG. 3 is a illustrative view of a radiation image converting method.

In FIG. 3, the numeral 41 denotes a radiation generator; R denotes radiation generated from the radiation generator; 42 denotes a subject; RI denotes radiation transmitted through the subject; 43 denotes a storage panel according to this invention; 44 denotes a stimulating light source; 45 denotes a photoelectric transducer to detect stimulated emission radiated from the storage panel; 46 denotes a unit to reproduce as an image the signals detected by 45; 47 denotes a unit to display a reproduced image; 48 denotes a filter to separate the stimulating light and stimulated emission and to pass only the stimulated emission. The units posterior to the unit 45 may be any of those which can reproduce light information from the storage panel 43 as an image in any form, and are by no means limited to the above-identified.

As shown in FIG. 3, the radiation from the radiation generator 41 is incident on the storage panel 43 through the subject 42. This radiation is absorbed in the phosphor layer of the storage panel 43, where its energy is stored, and a stored image of the radiation-transmitted image is formed.

Next, this stored image is excited by the stimulating light from the stimulating light source 44 and emitted as stimulated emission. The strength of the stimulated emission thus radiated is proportional to the amount of stored radiation energy. Accordingly, this light signal may be subjected to photoelectrical conversion by means of the photoelectric transducer 45 as exemplified by a photomultiplier tube, reproduced as an image by the image-reproducing unit 46, and may be displayed by the image display unit 47 so that the radiation-transmitted image of the subject can be viewed.

This invention will be described below by giving Examples.

Example 1

A support, crystallized glass plate of 1 mm thick, was subjected to sandblasting treatment. Next, formed onto the surface of the plate was a light-shielding layer with a thickness of 40 μm, a light transmittance of 0% and a light reflective index of 14% by flame-spraying $Al_2O_3$.40%$TiO_2$ by use of Lokide rod spray apparatus.

Then, onto the light-shielding layer, further formed was a light-scattering layer with a thickness of about 50 μm and a light reflective index of 73% by flame-spraying 99%$Al_2O_3$ powders with a particle size of 5 to 20 μm by use of a gas blast flame-spraying apparatus.

Next, the light-scattering layer was subjected to vapor deposition of alkali halide stimulable phosphor (RbBr: $1\times10^{-4}$ T1) by use of the electron beam vapor depositi method to a thickness of about 300 μm to obtain Storage panel A of this invention.

Example 2

The same procedure of Example 1 was repeated except that a light-shielding layer with a thickness of about 25 μm, a light transmittance of 0% and a light reflective index of 32% was formed by flame-spraying Ni-20%Cr powders with a particle size of 5 to 20 μm, instead of the provision of the light-shielding layer prepared by flame-spraying $Al_2O_3$.40%$TiO_2$, to obtain Storage panel B of this invention.

Example 3

A crystallized glass plate with a thickness of 1 mm was roughened by dipping in 20% hydrogen fluoride solution for 20 seconds and washing. Formed onto the foughened surface was a light-shielding layer with a light transmittance of 0.3% and a light reflective index of 75% by vapor depositing Al to a thickness of 0.25 μm according to the resistance-heating method. Then, a light-scattering layer and stimulable phosphor layer were provided on the light-shielding layer in the same manner as in Example 1 to obtain Storage panel C of this invention.

Example 4

The same procedure of Example 1 was repeated excepting that the thickness of the light-scattering layer was 20 μm and the light reflective index thereof was 52% to obtain Storage panel D of this invention.

Example 5

The same procedure of Example 1 was repeated excepting that the thickness of the light-scattering layer was 70 μm and the light reflective index thereof was 80% to obtain Storage panel E of this invention.

Example 6

The same procedure of Example 1 was repeated excepting that the thickness of the light-scattering layer was 100 μm and the light reflective index thereof was 88% to obtain Storage panel F of this invention.

Comparative example 1

The same procedure of Example 1 was repeated except that no light-shielding layer was formed to obtain Storage panel P for comparison.

Comparative example 2

The same procedure of Example 1 was repeated except that no light-scattering layer was formed to obtain Storage panel Q for comparison.

Comparative example 3

The same procedure of Example 2 was repeated except that no light-scattering layer was formed to obtain Storage panel R for comparison.

Comparative example 4

The same procedure of Example 3 was repeated except that no light-scattering layer was formed to obtain Storage panel S for comparison.

Figure 4:
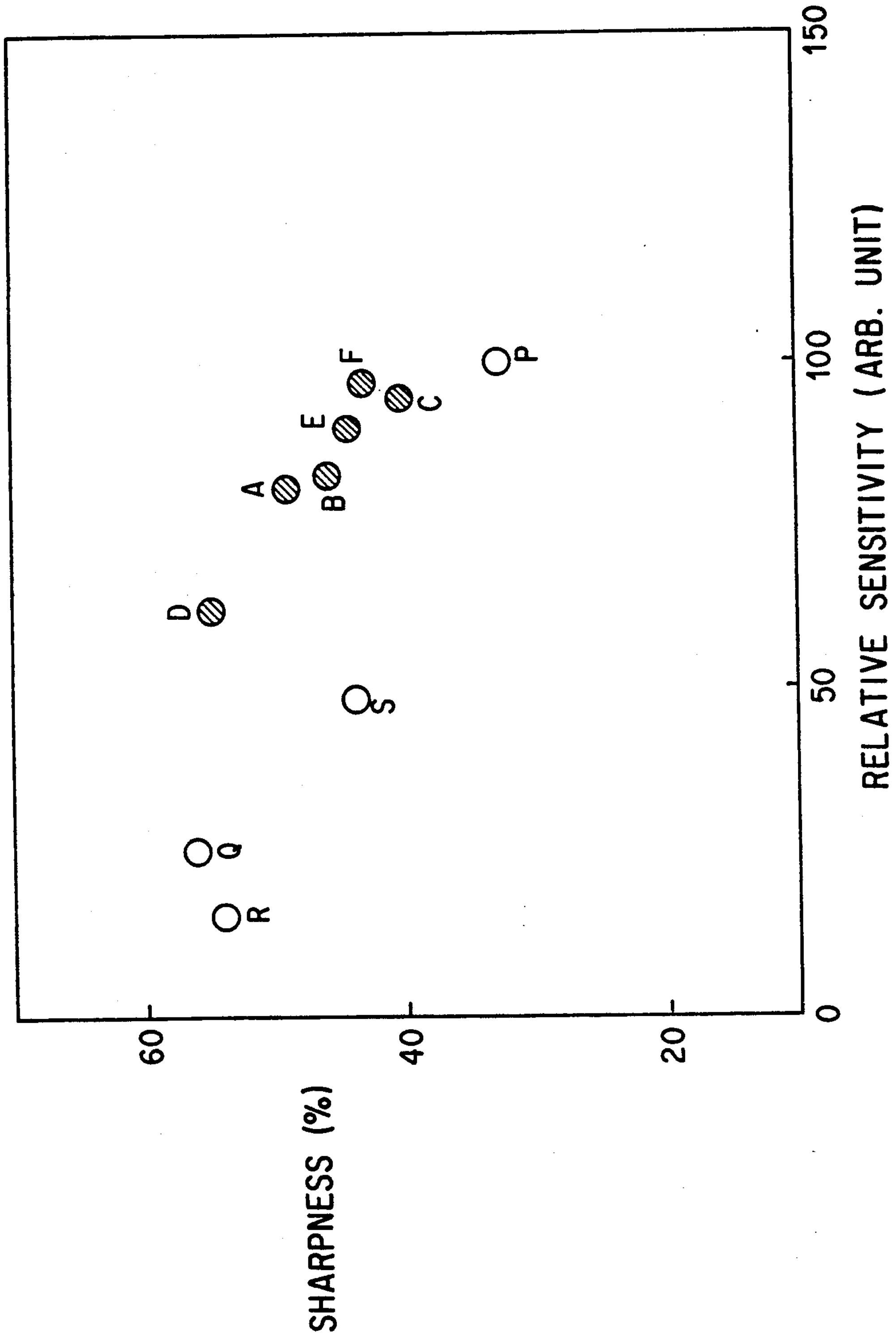
FIG. 4 is a view showing radiation sensitivity and MTF characteristics of the storage panels with examples and comparative examples.

These above storage panels were subjected to evaluations in sensitivity and sharpness. First, respective panels were exposed to 10 mR of X-rays having a tube voltage of 80 KVp, and thereafter were subjected to stimulating excitation using a semiconductor laser beam (780 nm), where the stimulated emission radiated from the stimulable layer was subjected to photoelectric conversion with use of a photoconductor (a photomultiplier tube), and the resulting signals were reproduced as an image by use of an image-reproducing unit, which was then analyzed. The sensitivity of the storage panel was examined from the size of the signals and a modulation transfer function (MTF) of the images was examined from the images obtained to obtain the results as shown in FIG. 4. In FIG. 4, an axis of abscissae indicates a sensitivity and an axis of ordinates indicates the MTF. The sensitivity to X-rays is indicated as a relative value assuming that of Storage panel P of Comparative example 1 as 100. The MTF value was a value at a spatial frequency of 2 cycles/mm.

As will be clear from FIG. 4, Storage panels A to F of this invention show enhancement of sharpness without lowering the sensitivity as compared with Storage panel P of Comparative example 1 having the light-scattering layer only. Also, Storage panels A to F show enhancement of sensitivity to a great extent without lowering sharpness so as compared with Storage panels Q to S of the comparative examples having the light-shielding layer only.

Further, as will be clear from the result of measurements of Storage panels A, D, E and F, the storage panel of this invention can be made having various sensitivities—MTF characteristics such as a high sensitivity type, high sharpness type, etc., by changing layer thickness of the light-scattering layer and leaving other constituting elements unchanged.

As described above, the storage panel of this invention is excellent in both the radiation image sensitivity and sharpness of images. Also, a storage panel having desired sensitivity—MTF characteristics (sharpness) can be obtained by appropriately selecting the thickness of the light-scattering layer.

We claim:

1. A radiation image storage panel which comprises a support and a light-shielding layer having a light transmittance of 5% or less for a light having a wavelength of 500 nm to 900 nm, a light-scattering layer having a light reflective index of 40% or more for a light having a wavelength of 300 nm to 900 nm and a stimulable phosphor layer that does not contain a binder formed on the support in succession.

2. The radiation image storage panel according to claim 1, wherein the light-shielding layer has a light reflective index ranging from 70% to 200% for the purpose of reflection of the stimulating light, and 40% or less for the purpose of absorption of the stimulating light.

3. The radiation image storage panel according to claim 1, wherein the light-shielding layer comprises at least one selected from the group consisting of aluminum, nickel, chromium, silver, copper, platinum, rhodium, titanium oxide, chromium oxide, and a mixture of aluminum oxide and titanium oxide.

4. The radiation image storage panel according to claim 1, wherein the light-shielding layer is formed by a physical vapor deposition method, and has a thickness ranging from 0.01 to 0.5 μm.

5. The radiation image storage panel according to claim 1, wherein the light-scattering layer has a light reflective index of 60% or more.

6. The radiation image storage panel according to claim 1, wherein the light-scattering layer comprises at least one selected from the group consisting of white lead, zinc oxide, titanium oxide, aluminum oxide, zirconium oxide and consisting of aluminum oxide and zirconium oxide with at least one selected from the group consisting of titanium oxide, silicate dioxide, magnesium oxide, calcium oxide and calcium carboxide.

7. The radiation image storage panel according to claim wherein the light-scattering layer has a thickness of 5 to 200 μm.

8. The radiation image storage panel according to claim 7, wherein the light-scattering layer has a thickness of 20 to 100 μm.

9. The radiation image storage panel according to claim 1, wherein the radiation image storage panel further comprises a protective layer on the stimulable phosphor layer.

10. The radiation image storage panel according to claim 1, wherein the support comprises at least one selected from the group consisting of chemically reinforced glass and crystallized glass.

11. The radiation image storage panel according to claim 1, wherein the stimulable phosphor layer comprises alkali halide phosphor.

12. The radiation image storage panel according to claim 1, wherein the light-shielding layer is formed by a plating method, and has a thickness ranging from 10 to 100 μm.

* * * * *

UNITED STATES PATENT AND TRADEMARK OFFICE

CERTIFICATE OF CORRECTION

PATENT NO. : 5,012,107

DATED : April 30, 1991

INVENTOR(S) : Akiko Kano et al.

It is certified that error appears in the above-identified patent and that said Letters Patent is hereby corrected as shown below:

Claim 6, column 11, line 23, before "consisting" insert --a mixture of at least one selected from the group--.

Claim 7, column 12, line 4, after "claim" insert --1,--.

Signed and Sealed this

Ninth Day of February, 1993

*Attest:*

STEPHEN G. KUNIN

*Attesting Officer*

*Acting Commissioner of Patents and Trademarks*